Sept. 19, 1939.   A. SKARSTEN   2,173,700
WOOD OR THE LIKE SCRAPER
Filed April 27, 1937

Inventor:
Anders Skarsten,
by Calvert Calvi
Attorneys.

Patented Sept. 19, 1939

2,173,700

UNITED STATES PATENT OFFICE 2,173,700

WOOD OR THE LIKE SCRAPER

Anders Skarsten, Welwyn Garden City, England

Application April 27, 1937, Serial No. 139,270
In Great Britain April 29, 1936

3 Claims. (Cl. 30—172)

This invention relates to scrapers for wood, glass, metal and like substances.

Such scrapers, as hitherto constructed, comprise essentially a blade formed as a single piece of metal carried by a handle. Such scrapers are suitable only for flat surfaces or for curved surfaces according to the shape of the cutting edge of the blade, the blade being incapable of adjustment to present cutting edges of different shape.

The present invention has for an object to provide a scraper which can be so adjusted that it can be used equally for scraping flat and curved surfaces of any description.

A further object is to provide a scraper having two cutting edges capable of adjustment in such manner that, if, for example, one edge is adjusted to provide a concave shape, the other edge will assume a convex shape of corresponding dimensions.

In accordance with the invention I provide, in scrapers for wood or the like, in lieu of a cutter formed from a single piece of metal, a cutter comprising a plurality of similar blades assembled together in a holder or the like in abutting relation in such manner that the blades present collectively one or more adjustable cutting edges.

In order to permit of the blades being clamped tightly together to form the cutter, they are preferably slotted for engagement by a bolt or the like carried by the holder, e. g. a yoke attached to a handle, nuts or the like being provided at one or both ends of the bolt or the like for clamping the blades together on the bolt or the like.

The blades should preferably be of a thickness comparable with that of the usual wafer safety-razor blade, it being appreciated that the thinner the blades, the greater will be the range of shapes which may be assumed by the cutting edge or edges presented by the blades. Also, where the cutting edges are adjusted to present a curved cutting surface the curve will be substantially continuous when the blades are of wafer-like dimensions. It will be understood, however, that the invention is not limited to a cutter comprising blades of any specified thickness.

The cutting edge or edges presented by the cutter constituted by the blades is or are capable of adjustment to assume an infinite variety of shapes, and thus may be employed for scraping mouldings, bevelled edges and the like. Also, the blades may be adjusted to present a straight cutting edge or edges the breadth of which may be varied by displacement of some of the strips.

Figure 1:
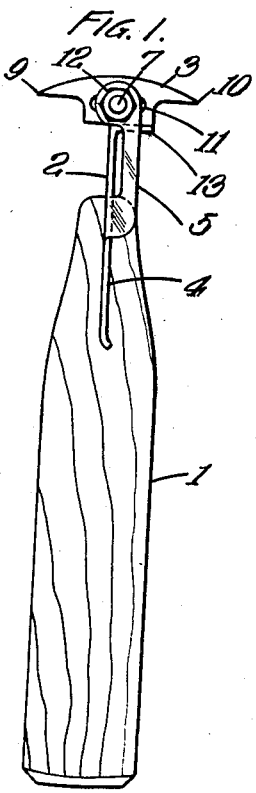
Figure 2:
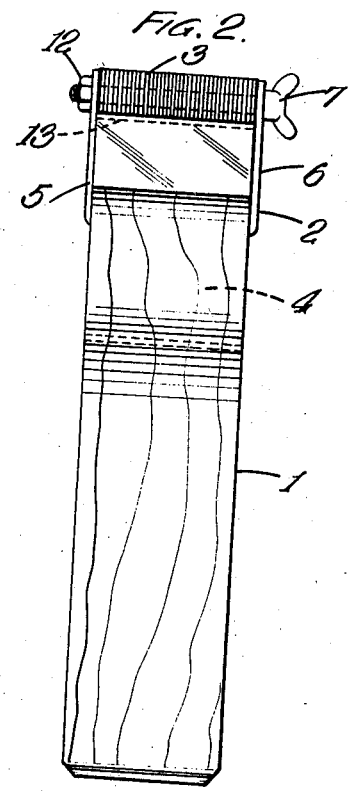

An embodiment of the invention is illustrated by way of example in the accompanying drawing in which Figs. 1 and 2 are side and front views respectively of a scraper having a double edged composite cutter according to the invention.

Figure 3:
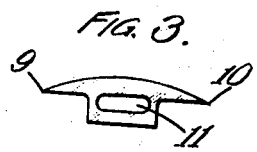
Figure 4:
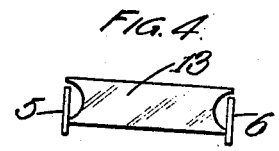
Figure 5:
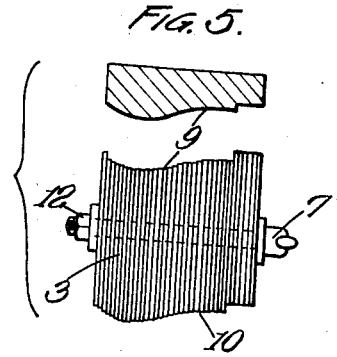
Figure 6:
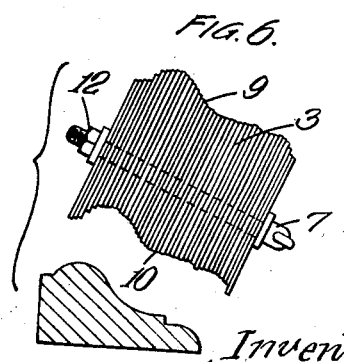

Fig. 3 is a side view of one of the blades of which the cutter is composed, Fig. 4 a plan view of a yoke on which the composite cutter is assembled, while Figs. 5 and 6 are plan views illustrating the cutter when adjusted to assume the shapes corresponding to those of the mouldings shown in section in these figures.

Referring to the drawing, the scraper comprises a handle 1 attached to which is a yoke 2 on which the cutter 3 is assembled.

As shown, the yoke 2 may be formed from a metal stamping, the centre portion 4 being forced into the handle 1, while the side portions 5, 6 are bent over at right angles to embrace the handle at their lower ends, thus preventing lateral displacement of the yoke, and to carry at their upper ends a bolt, rod or the like 7, for which purpose they are provided with slots 11 through which the bolt, rod or the like extends.

To prevent the yoke being dragged lengthwise out of the handle, the lower edge of the centre portion may conveniently be bent over as shown in the drawing.

On the bolt, rod or the like 7 are assembled a plurality of similar thin blades (one of which is illustrated in side view in Fig. 3) to form the cutter 3 of the scraper.

In the embodiment illustrated, each blade has opposed extremities tapering to points which collectively present two cutting edges 9, 10 respectively.

The bolt, rod or the like 7 extends through the slots 11 provided in each blade and is provided with a nut 12 by which the blades may be clamped tightly together thereon.

Desirably, the yoke 2 is formed from spring steel, so that the side portions 5, 6 which accommodate the blades may hold the blades reasonably tightly together when the nut 12 is loosened on the bolt 7 for adjustment purposes. Also, as shown, the centre portion of the yoke 2 may be bent over at right angles to form a shoulder 13 adapted to support in a plane at right angles to the handle the blades constituting the cutter.

As will readily be appreciated, each blade may be independently displaced transversely of the bolt, rod or the like 7 to such extent as is permitted by the slot 11.

In the use of the scraper, say, for the purpose of scraping a moulding such as illustrated in Fig.

5 or in Fig. 6, the nut 12 is loosened on the bolt 7, the blades constituting the cutter thereby being rendered capable of adjustment on the bolt. One of the cutting edges of the cutter is then applied to the surface of the moulding with sufficient pressure to displace the blades to assume a position in which the cutter presents an edge of the same shape as the moulding. The nut 12 is then tightened to clamp the blades tightly together, whereafter the scraper is available for use.

As will be seen from Figs. 5 and 6 of the drawing, the other edge of the cutter assumes a shape of opposite curvature and may be employed where it is desired to scrape a surface of that curvature.

If desired, some of the blades may be displaced to the full extent of their respective slots, leaving, for working purposes, a cutting edge of smaller breadth than the full breadth of the cutter.

It is to be understood that the scraper illustrated is shown by way of example only, the invention residing in the provision in a scraper of a cutter composed of a plurality of adjustable thin blades. Thus, the blades may be mounted on the handle by means other than that shown, while the blades may be of a shape different from that illustrated.

Also, the means for mounting the blades on the handle may be such that adjustment may be effected to permit of a varying number of blades being accommodated thereby. For example in lieu of the side portions 5, 6 rigidly attached to the yoke 2 illustrated in the accompanying drawing, adjustable side members may be provided, the adjustment, for instance, being effected by one or more set screws extending through the side members in such manner that the side members may be retracted towards or projected from each other, their distance apart determining the number of blades that can be accommodated between them. Thus, with such an arrangement varying widths of cutting edge or edges are obtainable in the one tool.

Also, by providing the blades each with only one cutting edge the cutter may be constructed to present only one cutting edge, instead of the two cutting edges provided in the cutter shown in the drawing.

As is self-evident the blades can readily be replaced when worn.

I claim:

1. A wood or the like scraper including a handle, a two armed yoke attached to said handle at one end and a cutter mounted on said yoke between the arms thereof and clear of said handle, said yoke comprising a central portion penetrating said handle at one end and presenting at the other a support for said cutter, and side members engaging said handle and said cutter, said cutter comprising a plurality of similar blades assembled together in abutting relation between said side members, and supported by said central portion in a common plane at right angles to the axis of and remote from the handle, and means traversing said blades and said side members to hold said blades clamped together, said blades providing collectively one or more adjustable cutting edges.

2. A wood or the like scraper including a handle, a yoke attached to said handle at one end and a cutter mounted on said yoke clear of said handle, said yoke comprising a central portion penetrating said handle at one end and presenting at the other a support for said cutter and side members engaging said handle and said cutter, said cutter comprising a plurality of similar blades assembled together in abutting relation between said side members and supported by said central portion in a common plane at right angles to the axis of and remote from the handle, each blade presenting at its extremities a pair of oppositely disposed cutting edges, and means traversing said blades and said side members to hold said blades clamped together, said blades providing collectively a pair of adjustable cutting edges.

3. A wood or the like scraper including a handle, a two-armed yoke attached to said handle at one end and a cutter mounted on said yoke between the arms thereof and clear of said handle, said yoke comprising a central portion penetrating said handle at one end and presenting at the other a support for said cutter, and side members engaging said handle and said cutter, said cutter comprising a plurality of similar blades assembled together in abutting relation between said side members and supported by said central portion in a common plane at right angles to the axis of and remote from the handle, and means traversing said blades and said side members to hold said blades clamped together, said blades being relatively adjustable transversely of the axis of said support and providing one or more adjustable cutting edges.

ANDERS SKARSTEN.